(12) United States Patent
Nomura (10) Patent No.: US 11,447,079 B2
(45) Date of Patent: Sep. 20, 2022

(54) VEHICLE INTERIOR COMPONENT AND METHOD FOR MANUFACTURING VEHICLE INTERIOR COMPONENT

(71) Applicant: KASAI KOGYO CO., LTD., Kanagawa (JP)

(72) Inventor: Hiroki Nomura, Hiratsuka (JP)

(73) Assignee: KASAI KOGYO CO., LTD., Kanagawa (JP)

(*) Notice: Subject to any disclaimer, the term of this patent is extended or adjusted under 35 U.S.C. 154(b) by 277 days.

(21) Appl. No.: 16/753,596

(22) PCT Filed: Jan. 5, 2018

(86) PCT No.: PCT/JP2018/000049
§ 371 (c)(1),
(2) Date: Apr. 3, 2020

(87) PCT Pub. No.: WO2019/135275
PCT Pub. Date: Jul. 11, 2019

(65) Prior Publication Data
US 2020/0331410 A1    Oct. 22, 2020

(51) Int. Cl.
*B60R 13/02*     (2006.01)
*B29C 44/12*     (2006.01)
(Continued)

(52) U.S. Cl.
CPC .......... *B60R 13/0212* (2013.01); *B29C 44/12* (2013.01); *B29C 44/42* (2013.01);
(Continued)

(58) Field of Classification Search
CPC ......... B32B 5/18; B60R 13/01; B60R 13/011; B60R 13/0212; B60R 13/0815
(Continued)

(56) References Cited

U.S. PATENT DOCUMENTS 5,219,893 A    6/1993  Koenig et al.
2011/0151241 A1  6/2011  Mikami
(Continued)

FOREIGN PATENT DOCUMENTS

CN    103732940 A     4/2014
EP    1470992 A2 *  10/2004 ........... B60R 13/011
(Continued)

OTHER PUBLICATIONS

English translation of JP 2003-146173; retrieved via PatentTranslate located at www.epo.org. (Year: 2003).*

(Continued)

*Primary Examiner* — Jason S Daniels
(74) *Attorney, Agent, or Firm* — United IP Counselors, LLC (57) ABSTRACT

A vehicle interior component including a plurality of functional parts and a method of manufacturing the same are provided. A headliner which is a vehicle interior component includes a sheet-like core member formed of a urethane foam. The headliner has a plurality of functional parts with different functions set in a plane of the headliner. The core member has an in-plane distribution of a characteristic of the urethane foam varied corresponding to the plurality of functional parts.

8 Claims, 6 Drawing Sheets

(51) Int. Cl.
  *B29C 44/42* (2006.01)
  *B32B 5/18* (2006.01)
  *B60R 13/08* (2006.01)
  *B29L 31/30* (2006.01)

(52) U.S. Cl.
  CPC ............ *B32B 5/18* (2013.01); *B60R 13/0815* (2013.01); *B29L 2031/3005* (2013.01); *B32B 2266/0278* (2013.01); *B32B 2605/003* (2013.01)

(58) Field of Classification Search
  USPC ........................................................ 296/1.08
  See application file for complete search history.

(56) References Cited

U.S. PATENT DOCUMENTS

| | | | |
|---|---|---|---|
| 2014/0151171 | A1 | 6/2014 | Sato et al. |
| 2016/0046758 | A1 | 2/2016 | Boehnke et al. |
| 2018/0022070 | A1* | 1/2018 | Kwon ................... B32B 27/308 428/219 |
| 2019/0111859 | A1* | 4/2019 | Kumamoto ............. B32B 5/245 |

FOREIGN PATENT DOCUMENTS

| | | | |
|---|---|---|---|
| JP | H04-169346 A | | 6/1992 |
| JP | H04-211416 A | | 8/1992 |
| JP | 2002-337160 A | | 11/2002 |
| JP | 2003146173 A | * | 5/2003 |
| JP | 2007-045098 A | | 2/2007 |
| JP | 2007-055306 A | | 3/2007 |
| JP | 2007-125949 A | | 5/2007 |
| JP | 2007-331673 A | | 12/2007 |
| JP | 2011-183924 A | | 9/2011 |
| JP | 2013-040625 A | | 2/2013 |
| JP | 2014-031073 A | | 2/2014 |
| JP | 2016-514739 A | | 5/2016 |
| JP | 2016-124458 A | | 7/2016 |
| JP | 2016-159706 A | | 9/2016 |
| JP | 2019-084910 A | | 6/2019 |
| WO | 2010/029861 A1 | | 3/2010 |

OTHER PUBLICATIONS

International Search Report for International Application No. PCT/JP2018/000049 dated Feb. 13, 2018, Japan, 1 page.
Office Action for corresponding Japanese Application No. 2019-563723 dated Apr. 6, 2021, Japan, 1 page.
Product catalog of SOFLAN-R (product name of rigid polyurethane foam) of Japan Soflan Chemical Industrial Co., Ltd., revised edition in Oct. 1979, Japan, 7 pages.

* cited by examiner

VEHICLE INTERIOR COMPONENT AND METHOD FOR MANUFACTURING VEHICLE INTERIOR COMPONENT

CROSS-REFERENCE TO RELATED APPLICATIONS

This application is a National Stage Entry application of PCT International Application No. PCT/JP2018/000049, filed on Jan. 5, 2018, the entire contents of which are hereby incorporated by reference.

BACKGROUND

1. Technical Field

The present invention relates to a vehicle interior component and a method of manufacturing the same.

2. Description of the Background

What is conventionally known as an exemplary vehicle interior component is a headliner, which is mounted on the interior side of a roof panel for decorativeness or any other function. The headliner is a laminate of a sheet-like core member made up of: a resin foam such as a urethane foam; a reinforcement sheet for securing rigidity; and a surface member for providing a motif (for example, see Japanese Unexamined Patent Application No. 2007-331673, hereinafter referred to as Patent Literature 1).

In the headliner of this type, the urethane foam which is the core member is generally formed with a uniform characteristic over the entire plane of the headliner.

BRIEF SUMMARY

Meanwhile, the headliner is required to exhibit predetermined functions at respective sites in the plane. Here, it is difficult to implement a plurality of well-balanced functional parts with the conventional core member. For example, a headliner which is to exhibit high rigidity employs a core member with a high hardness and a great thickness. The provided core member is processed to have a predetermined shape by heat press forming or the like. Since the core member of a high rigidity suffers limitations in the forming, a functional part with a complicated appearance (a design part) is hard to be implemented. Additionally, the high rigidity over the entire plane of the headliner invites an increase in weight of the product as a whole. Furthermore, since the core member of a high rigidity is low in air permeability, a functional part with a sound absorption performance (a sound absorption part) is hard to be implemented.

The present invention has been made in view of the foregoing, and an object of the present invention is to provide a vehicle interior component which includes a plurality of functional parts and a method of manufacturing the same.

In order to solve the problem, a first aspect of the invention provides a vehicle interior component configured to cover an interior side of a vehicle body panel. The vehicle interior component includes a core member being sheet-like and formed of a resin foam. The vehicle interior component has a plurality of functional parts with different functions set in a plane of the vehicle interior component. The core member has an in-plane distribution of a characteristic of the resin foam varied corresponding to the plurality of functional parts.

A second aspect of the invention provides a method of manufacturing a vehicle interior component configured to cover an interior side of a vehicle body panel. The method of manufacturing a vehicle interior component includes: a first step of injecting a resin foam liquid into a container; a second step of foaming the resin foam liquid in the container, to form a resin foam; and a third step of slicing the resin foam formed in the second step by a predetermined thickness to be sheet-like. In this case, the vehicle interior component has a plurality of functional parts with different functions set in a plane of the vehicle interior component. The container includes a partition member partitioning inside of the container corresponding to the plurality of functional parts. The first step includes injecting the resin foam liquids which realize characteristics of the resin foam respectively corresponding to the functional parts into space units partitioned by the partition member. The second step includes removing the partition member along with the foaming the resin foam liquid.

In the present invention, the vehicle interior component preferably a headliner configured to cover an interior side of a roof panel.

In the present invention, the plurality of functional parts preferably include a design part with formability, a rigidity part with rigidity, and a sound absorption part with sound absorption performance.

In the present invention, the resin foam is preferably a urethane foam. The design part preferably exhibits a percentage elongation of 20% or more as a characteristic of the urethane foam. The rigidity part preferably exhibits a compressive stress at 20% relative deformation of 0.13 MPa as a characteristic of the urethane foam. The sound absorption part preferably exhibits a permeability of 3 $cc/cm^2/sec$ as a characteristic of the urethane foam.

The present invention employs the structure in which the characteristic of a urethane foam which forms a core member is locally different in the plane of the core member. Thus, in a plane of a vehicle interior component, a plurality of well-balanced functional parts exhibiting different functions are implemented.

DETAILED DESCRIPTION

Figure 1:
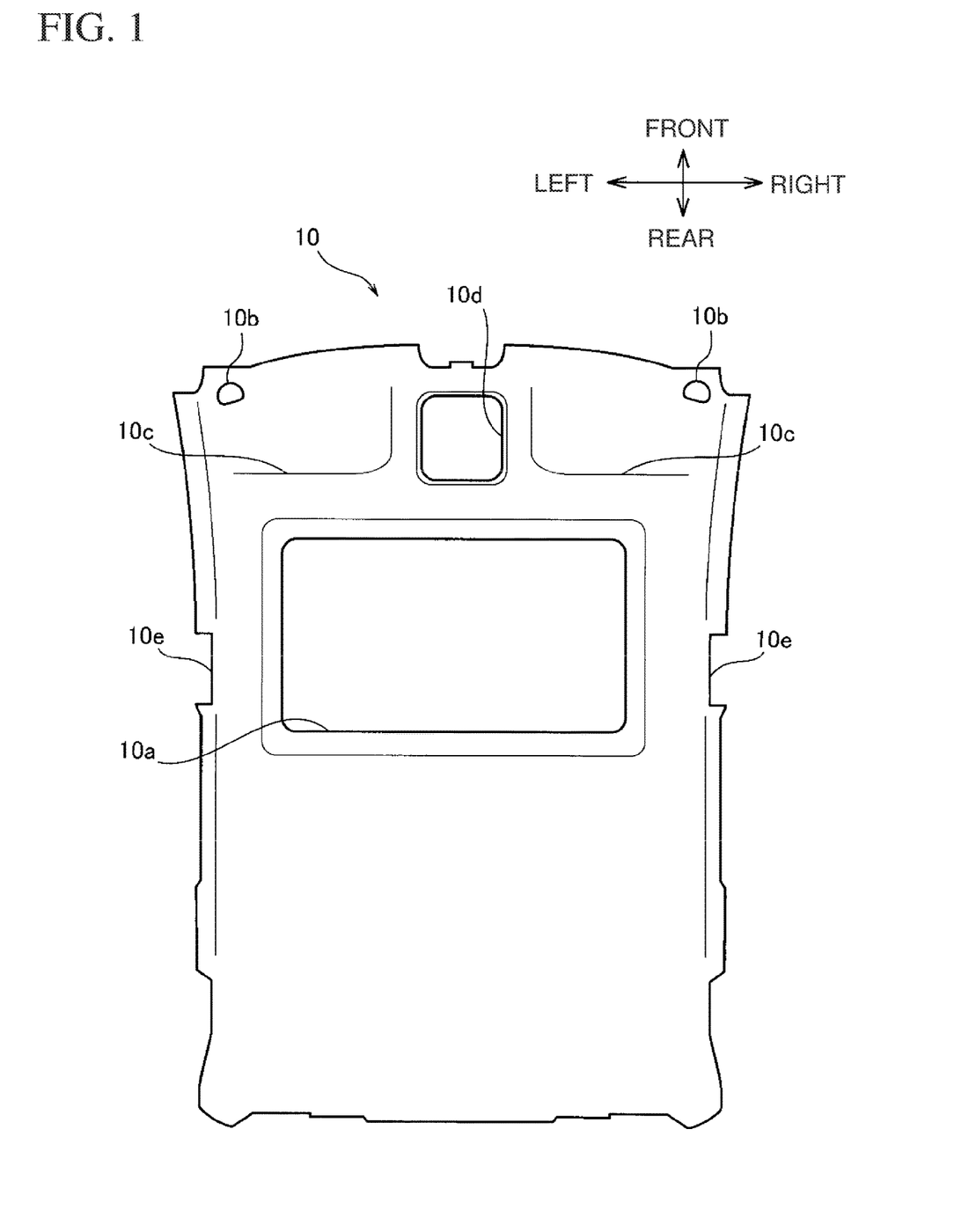
FIG. 1 is a plan view schematically showing a headliner according to the present embodiment.
Figure 2:
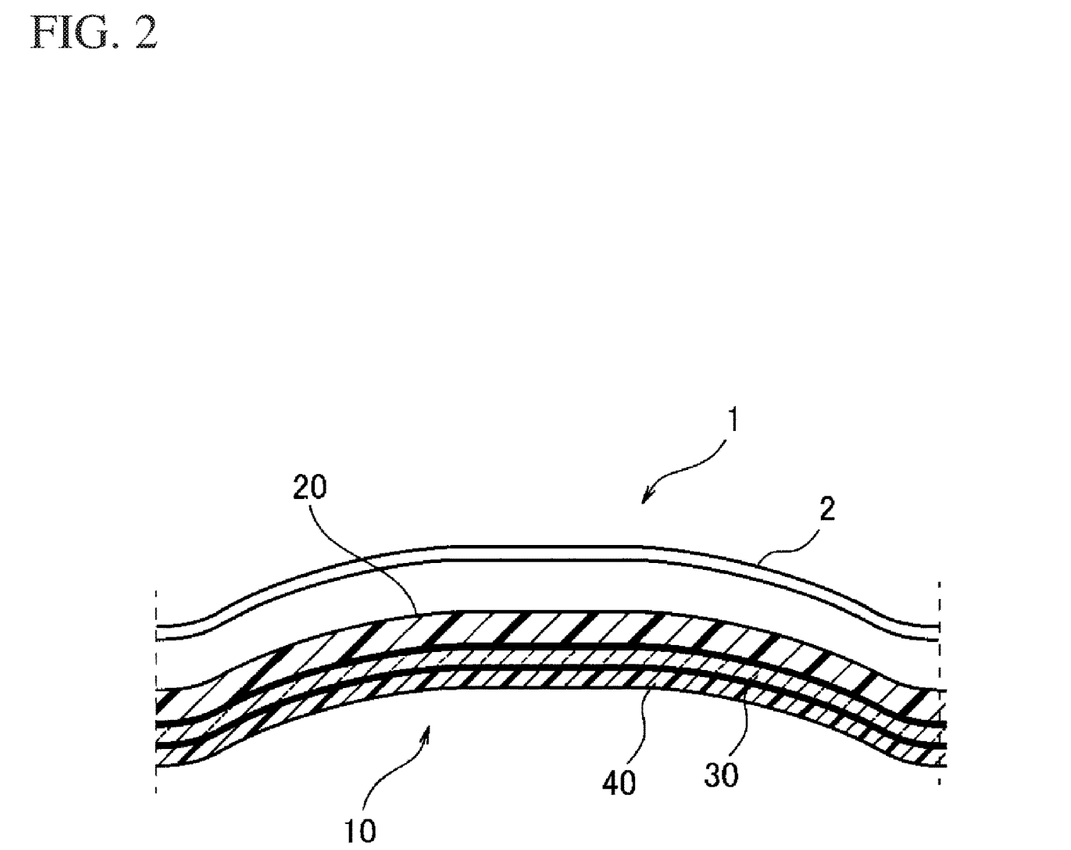
FIG. 2 is a cross-sectional view schematically showing the main part of a roof part.
Figure 3:
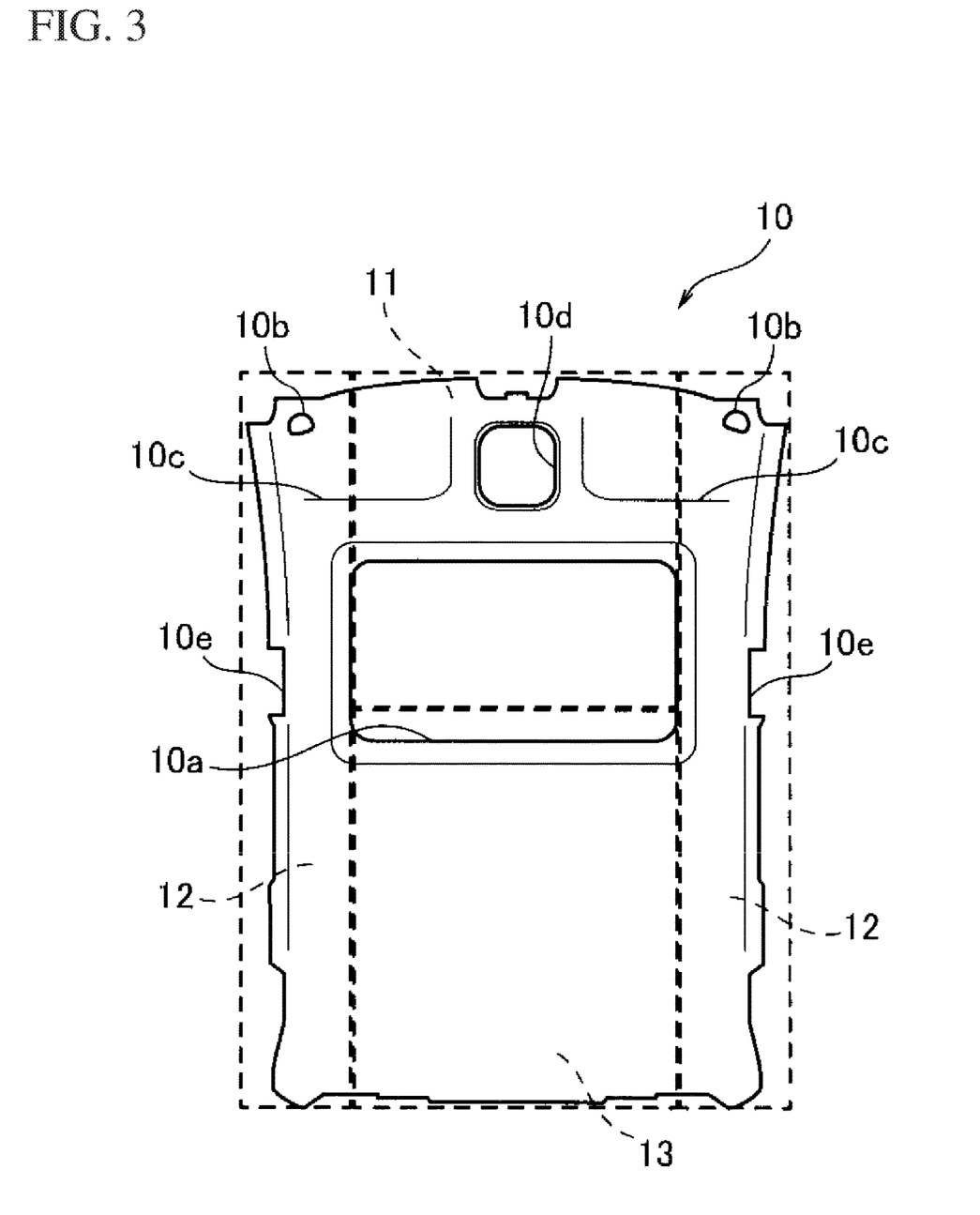
FIG. 3 is an explanatory illustration for describing functional parts of the headliner.
Figure 4:
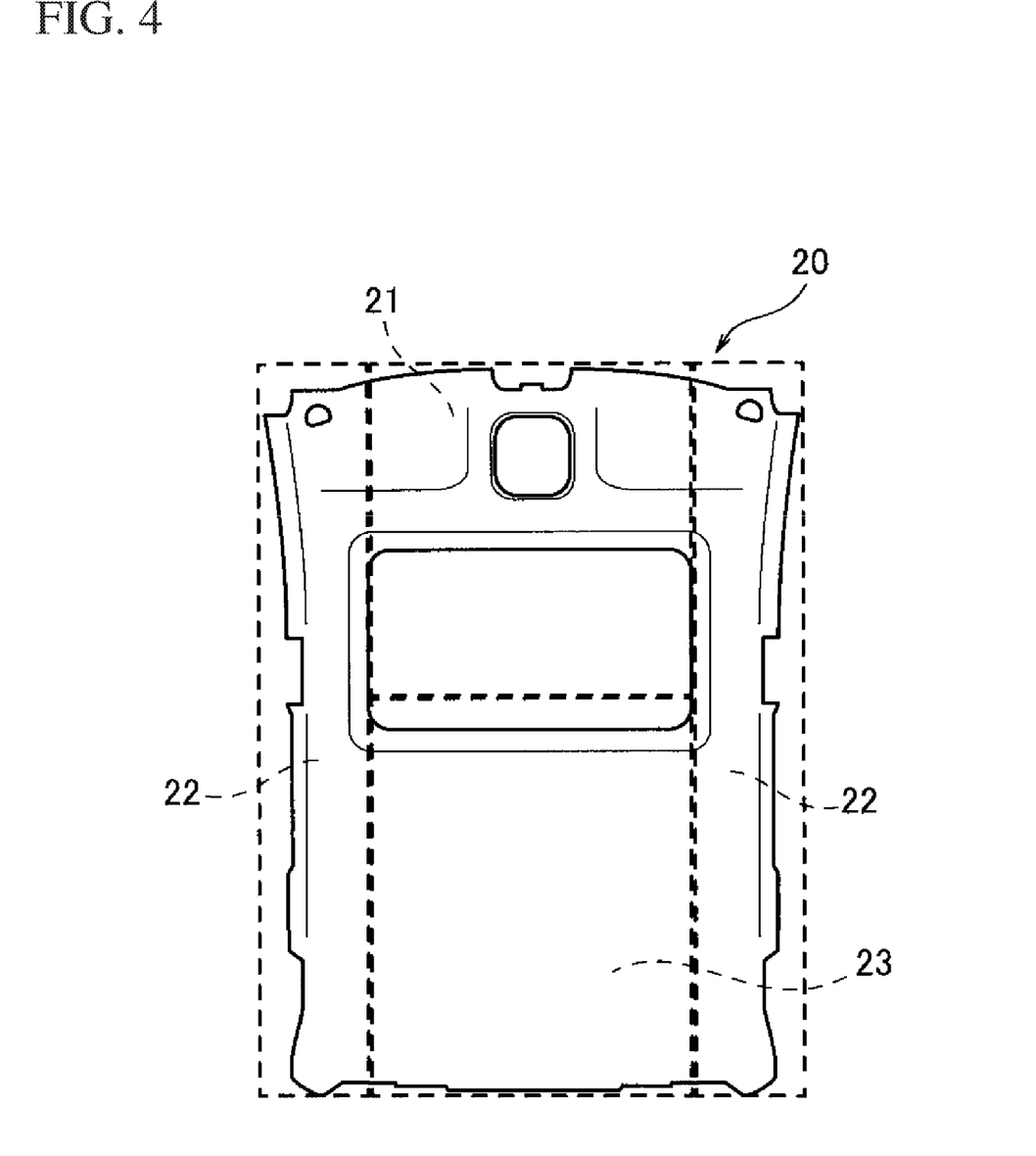
FIG. 4 is an explanatory illustration showing the structure of a core member.

In the following, a description will be given of a headliner 10 as a vehicle interior component according to the present embodiment. FIG. 1 is a plan view schematically showing the headliner 10 according to the present embodiment. FIG. 2 is a cross-sectional view schematically showing the main part of a roof part 1. FIG. 3 is an explanatory illustration for describing functional parts of the headliner 10. FIG. 4 is an explanatory illustration showing the structure of a core member 20.

The roof part 1 of a vehicle includes a roof panel 2 as a vehicle body panel. On the interior side of the roof panel 2, the headliner 10 is mounted. The headliner 10 is disposed in close proximity to the roof panel 2, and covers the roof panel 2.

At the center of the headliner 10, a sunroof opening 10a which corresponds to a sunroof unit (not shown) configured to open and close an opening formed at the roof panel 2 is provided. On the front side in the headliner 10, sun visor openings 10b for mounting sun visors (not shown) on the roof panel 2 and storage parts 10c shaped to stow the sun visors are provided so as to correspond to the drives seat and the passenger's seat, respectively. On the front central side in the headliner 10 (between the right and left storage parts 10c), an interior light opening 10d for mounting an interior light (not shown) on the roof panel 2 is provided. At the right and left edges of the headliner 10, grip parts 10e for the operator to handle the headliner 10 during manufacture are provided.

The headliner 10 is, for example, a laminate made up of the core member 20, a reinforcement sheet 30, and a surface member 40. The core member 20 is the basic member of the headliner 10, and is a sheet-like member formed of a urethane foam. The reinforcement sheet 30 is a sheet for reinforcing the core member 20, and provided on the surface side of the core member 20. The reinforcement sheet 30 is formed of a fiber material such as glass mat, glass fibers or the like. The surface member 40 is bonded to the reinforcement sheet 30, to implement a motif surface on the interior side. Note that, the headliner 10 may further include a reinforcement sheet and a back-surface film laminated on the back surface side of the core member 20. The back-surface film is an air-impermeable film formed of hard resin such as polypropylene-based resin. The back-surface film blocks air permeation in the thickness direction of the headliner 10 so as to avoid dust from attaching to the surface of the surface member 40, and to improve releasability from a die in forming. On the roof panel 2 side of the back-surface film, a far infrared reflective layer which cuts far infrared ray using reflection may be provided. The far infrared reflective layer may be a metal film or metal foil. Furthermore, on the roof panel 2 side of the far infrared reflective layer, an antioxidant coating layer for minimizing oxidation of the metal surface may be provided. The antioxidant coating layer may be formed by applying epoxy-based resin, acrylic resin or the like.

As shown in FIG. 3, in the headliner 10, a plurality of functional parts respectively assigned to predetermined functions are set. In the present embodiment, a plurality of functional parts include a design part 11, rigidity parts 12, and a sound absorption part 13.

The design part 11 is a functional part assigned to formability in the headliner 10. The sites such as the storage parts 10c for the sun visors and the interior light opening 10d must exhibit formability for those parts to be formed. The design part 11 is set at the site where formability is required, specifically, the site on the front and central site in the headliner 10.

The rigidity parts 12 are functional parts assigned to high rigidity in the headliner 10. The sites such as the grip parts 10e must exhibit rigidity for the operator to handle the headliner 10 in mounting it on the vehicle. The rigidity parts 12 are set at the sites where rigidity is required, specifically, the sites on the right and left sides in the headliner 10.

The sound absorption part 13 is a functional part assigned to high sound absorption performance in the headliner 10. The rear central site of the headliner 10 must exhibit sound absorption performance in the space of the cabin. The sound absorption part 13 is set at the site where the sound absorption performance is required, specifically, the rear central site in the headliner 10 corresponding to the main space in the cabin.

The core member 20 has the in-plane distribution of the characteristic of the urethane foam varied corresponding to the plurality of functional parts of the headliner 10 which are the design part 11, the rigidity parts 12, and the sound absorption part 13 in the present embodiment. As shown in FIG. 4, at a site 21 of the core member 20 corresponding to the design part 11, the percentage elongation as a characteristic of the urethane foam is set to 20% or more. This characteristic value is derived to satisfy the desired formability. At sites 22 of the core member 20 corresponding to the rigidity parts 12, compressive stress at 20% relative deformation as a characteristic of the urethane foam is set to 0.13 MPa or more. This characteristic value is derived to satisfy the desired rigidity. At a site 23 of the core member 20 corresponding to the sound absorption part 13, permeability as a characteristic of the urethane foam is set to 3 $cc/cm^2/sec$ or more. This characteristic value is derived to satisfy the desired sound absorption performance. The physical property values of the urethane foam corresponding to the sites 21, 22, 23 are measured on the basis of ASTM D3574. As has been described above, in the core member 20 according to the present embodiment, the characteristics of a urethane foam corresponding to a plurality of functional parts are realized in a single sheet. Thus, in the plane of the headliner 10, the characteristic of the core member 20 (the headliner 10) is locally varied.

Figure 5A:
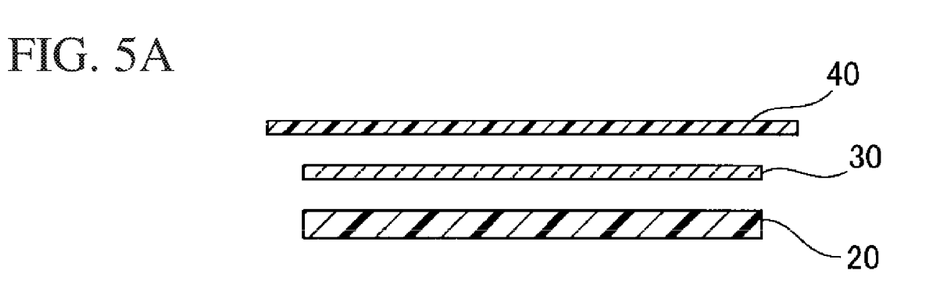
FIGS. 5A and 5B are explanatory illustrations showing the manufacturing steps of the headliner.
Figure 5B:
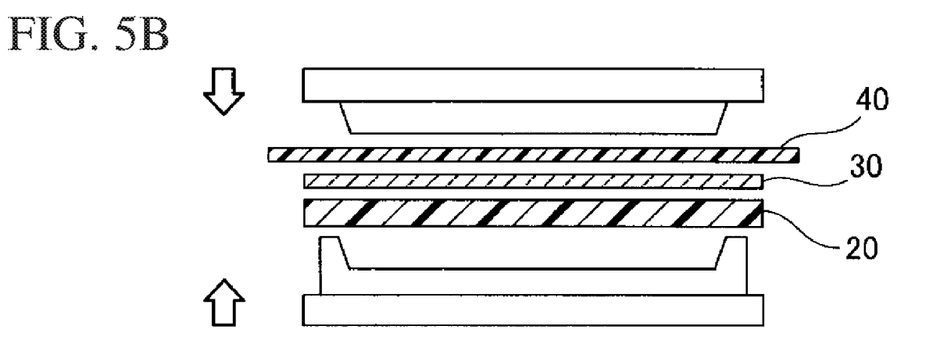

In the following, a description will be given of a method of manufacturing the headliner 10 according to the present embodiment. FIGS. 5A and 5B are explanatory illustrations showing steps of manufacturing the headliner 10.

Firstly, the urethane foam is sliced by a predetermined thickness, to provide the sheet-like core member 20. Note that, the method of fabricating the sheet-like core member 20 will be described later. Next, on at least one surface of the core member 20, the reinforcement sheet 30 and the surface member 40 are sequentially laminated (FIG. 5A). Next, the laminated members are integrally joined and formed to have a predetermined shape by heat press forming (FIG. 5B). Thus, as described above, the headliner 10 which is a laminate of the core member 20, the reinforcement sheet 30, and the surface member 40 is manufactured.

Figure 6A:
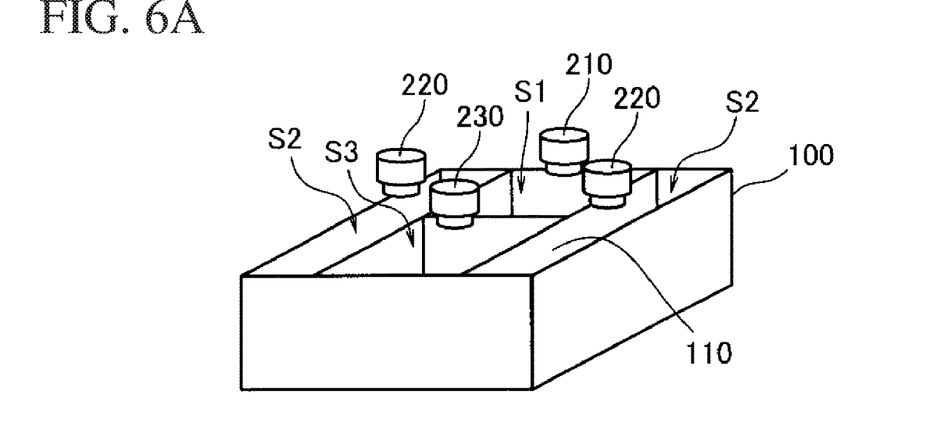
FIGS. 6A to 6C are explanatory illustrations showing the fabricating steps of the core member.
Figure 6B:
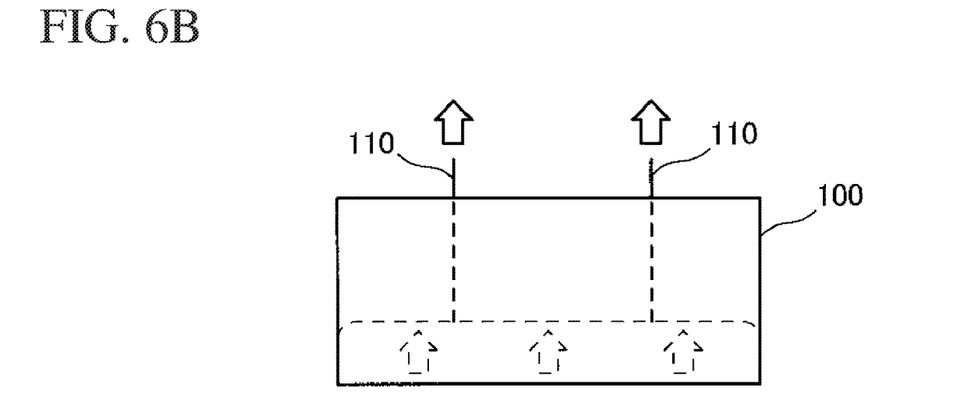
Figure 6C:
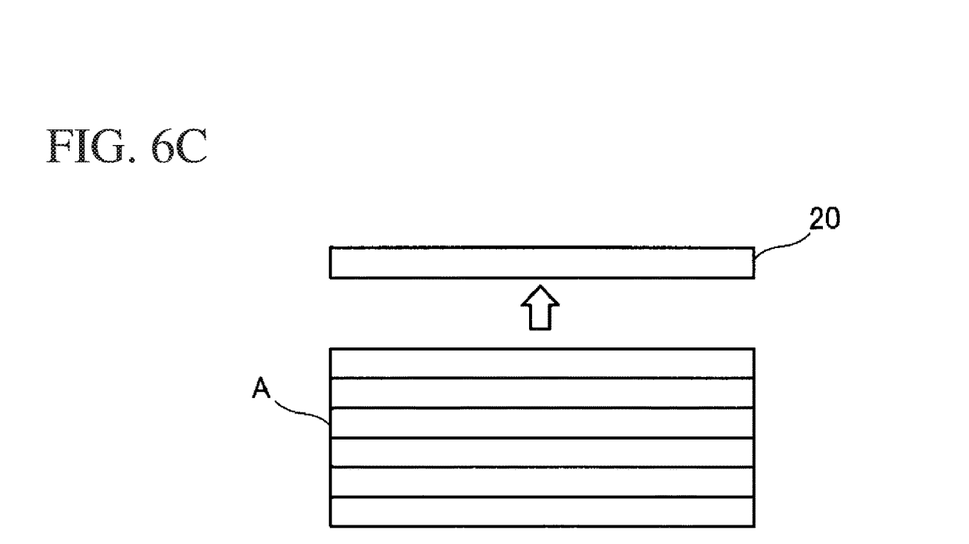

Next, a description will be given of the steps of fabricating the sheet-like core member 20. FIGS. 6A to 6C are explanatory illustrations showing the fabricating steps of the core member 20.

Firstly, as the first step, into a container 100, a resin mixture liquid which contains at least the first raw material liquid containing polyol and the second raw material liquid containing isocyanate compound is injected. The container 100 is equivalent in plane size to the headliner 10. In the container 100, a partition member 110 is provided to partition the inside of the container 100 corresponding to the plurality of functional parts of the headliner 10. The partition member 110 divides the space in the container 100 into four units of space, namely, first space unit S1 which corresponds to the design part 11 on the front central side in the headliner 10, second space unit S2 which corresponds to the rigidity parts 12 on the right and left sides in the headliner 10, and third space unit S3 which corresponds to the sound absorption part 13 on the rear central side in the headliner 10. The partition member 110 is shiftable in the vertical direction, and can be removed from the container 100.

In the first step, into the space units S1, S2, S3 partitioned by the partition member 110, resin mixture liquids are injected through nozzles 210, 220, 230 respectively corresponding to the space units S1, S2, S3 (FIG. 6A). The first nozzle 210, the second nozzle 220, and the third nozzle 230 are supplied with the resin mixture liquids independently of one another. In this case, corresponding to the composition of the resin mixture liquids respectively supplied to the nozzles 210, 220, 230, the characteristic of the formed urethane foam is different. Accordingly, into the space units S1, S2, S3 partitioned by the partition member 110, the resin mixture liquids which realize the characteristics of the urethane foam corresponding to the functional parts are injected.

Specifically, into the first space unit S1 corresponding to the design part 11, a resin mixture liquid which realizes a urethane foam with high formability is injected from the first nozzle 210. In this case, the index of the characteristic of the urethane foam is that the percentage elongation is 20% or more (ASTM D3574). Into the second space unit S2 corresponding to the rigidity parts 12, a resin mixture liquid which realizes a urethane foam with high rigidity is injected from the second nozzle 220. In this case, the index of the characteristic of the urethane foam is that the compressive stress at 20% relative deformation is 0.13 MPa or more (ASTM D3574). Into the third space unit S3 corresponding to the sound absorption part 13, a resin mixture liquid which realizes a urethane foam with high sound absorption performance is injected from the third nozzle 230. In this case, the characteristic of the urethane foam is that the permeability is 3 cc/cm$^2$/sec or more (ASTM D3574).

The composition of the resin mixture liquid can be changed by changing a mixture ratio between the first raw material liquid containing polyol and the second raw material liquid containing an isocyanate compound. The composition may be changed by other means, and may be changed by changing the raw material liquids.

Next, in the second step, the resin mixture liquid is foamed in the container 100, to be a urethane foam. The second step includes a step of removing the partition member 110 along with the forming the resin mixture liquid in the space units S1, S2, S3 (FIG. 6B). Thus, foams foamed in the space units S1, S2, S3 are coupled to each other, and integrated in the container 100.

In the third step, a urethane foam A formed in the second step is sliced into a sheet by a predetermined thickness (FIG. 6C). The sliced sheets are each used as the core member 20.

The core member 20 is fabricated through the series of steps described above. The core member 20 exhibits the characteristics corresponding to the plurality of functional parts set to the headliner 10 in a single sheet.

Thus, the headliner 10 according to the present embodiment includes the sheet-like core member 20 formed of a urethane foam. The headliner 10 has a plurality of functional parts with different functions set in the plane of the headliner 10. The core member 20 has the in-plane distribution of the characteristic of the urethane foam varied corresponding to the plurality of functional parts.

In this structure, the characteristic of the urethane foam forming the core member 20 is locally varied in the plane of the core member 20. Accordingly, the plurality of well-balanced functional parts assigned to different functions are realized in the plane of the headliner 10.

In the present embodiment, the plurality of functional parts include the design part 11 with formability, the rigidity parts 12 with rigidity, and the sound absorption part 13 with the sound absorption performance.

In this structure, the different functions of formability, rigidity, and sound absorption performance are provided in the plane of the headliner 10 independently of one another. Thus, the functions demanded of the headliner 10 are properly realized.

In the present embodiment, the design part 11 is set to exhibit a percentage elongation of 20% or more as a characteristic of the urethane foam; the rigidity parts 12 is set to exhibit a compressive stress at 20% relative deformation of 0.13 MPa or more as a characteristic of the urethane foam; and the sound absorption part 13 is set to exhibit a permeability of 3 cc/cm$^2$/sec or more as a characteristic of the urethane foam.

In this structure, the different functions of formability, rigidity, and sound absorption performance are provided to the necessary sites of the headliner 10 independently of one another. Thus, the functions demanded of the headliner 10 are properly realized.

In the present embodiment, the description has been given of the structure in which the headliner 10 includes three functional parts. The number of the functional parts of the headliner 10 is not specified thereto, and the headliner 10 should just include a plurality of functional parts. In this case, in manufacturing the core member 20, the nozzles should be provided as many as the functional pails, and the partition member 110 should form the space units corresponding to the functional parts.

Therefore, in the method of manufacturing the headliner 10 according to the embodiment, the layout of the functional parts in the plane of the headliner 10 may be freely set according to the setting of the partition member 110 and the nozzles. Accordingly, whatever specification demanded of the headliner 10, the headliner 10 realizing the specification is manufactured with ease.

In the foregoing, the description has been given of the headliner as a vehicle interior component according to an embodiment of the present invention. Here, it goes without saying that the present invention is not limited to the embodiment described above, and various changes can be made within the scope of the invention. The present invention is applicable to not only the headliner but also any vehicle interior component which covers the interior side of the vehicle body panel. The method of manufacturing a vehicle interior component itself also functions as part of the present invention.

Furthermore, while the present embodiment exemplarily describes that the resin foam is a urethane foam and the resin foam liquid is a resin mixture liquid which contains at least the first raw material liquid containing polyol and the second raw material liquid which contains an isocyanate compound, any resin foam and any resin foam liquid which attain the function and effect similar to those described in the embodiment may be employed.

REFERENCE SIGNS LIST 1 roof part
2 roof panel
10 headliner
10a sunroof opening
10b sun visor opening
10c storage part
10d interior light opening 10e grip part
11 design part
12 rigidity part
13 sound absorption part
20 core member
21 site
22 site
23 site
30 reinforcement sheet
40 surface member
100 container
110 partition member
210, 220, 230 nozzle (first nozzle, second nozzle, third nozzle)
S1, S2, S3 space unit (first space unit, second space unit, third space unit)
A urethane foam

The invention claimed is:

1. A vehicle interior component configured to cover an interior side of a vehicle body panel, the vehicle interior component comprising
 a core member being sheet-like and formed of a resin foam, wherein
 the vehicle interior component has a plurality of functional parts with different functions set in a plane of the vehicle interior component,
 the core member has an in-plane distribution of a characteristic of the resin foam varied corresponding to the plurality of functional parts, and
 the plurality of functional parts include
  a design part with formability,
  a rigidity part with rigidity, and
  a sound absorption part with sound absorption performance.

2. The vehicle interior component according to claim 1, wherein the vehicle interior component is a headliner configured to cover an interior side of a roof panel.

3. The vehicle interior component according to claim 2, wherein
 the resin foam is a urethane foam,
 the design part exhibits a percentage elongation of 20% or more as a characteristic of the urethane foam,
 the rigidity part exhibits a compressive stress at 20% relative deformation of 0.13 MPa as a characteristic of the urethane foam, and
 the sound absorption part exhibits a permeability of 3 cc/cm2/sec as a characteristic of the urethane foam.

4. The vehicle interior component according to claim 1, wherein
 the resin foam is a urethane foam,
 the design part exhibits a percentage elongation of 20% or more as a characteristic of the urethane foam,
 the rigidity part exhibits a compressive stress at 20% relative deformation of 0.13 MPa as a characteristic of the urethane foam, and
 the sound absorption part exhibits a permeability of 3 cc/cm2/sec as a characteristic of the urethane foam.

5. A method of manufacturing a vehicle interior component configured to cover an interior side of a vehicle body panel, the method comprising:
 a first step of injecting a resin foam liquid into a container;
 a second step of foaming the resin foam liquid in the container, to form a resin foam; and
 a third step of slicing the resin foam formed in the second step by a predetermined thickness to be sheet-like, wherein
 the vehicle interior component has a plurality of functional parts with different functions set in a plane of the vehicle interior component,
 the container includes a partition member partitioning inside of the container corresponding to the plurality of functional parts,
 the first step includes injecting the resin foam liquids which realize characteristics of the resin foam respectively corresponding to the functional parts into space units partitioned by the partition member, and
 the second step includes removing the partition member along with the foaming the resin foam liquid.

6. The method of manufacturing a vehicle interior component according to claim 5, wherein the vehicle interior component is a headliner configured to cover an interior side of a roof panel.

7. The method of manufacturing a vehicle interior component according to claim 6, wherein the plurality of functional parts include
 a design part with formability,
 a rigidity part with rigidity, and
 a sound absorption part with sound absorption performance.

8. The method of manufacturing a vehicle interior component according to claim 5, wherein the plurality of functional parts include
 a design part with formability,
 a rigidity part with rigidity, and
 a sound absorption part with sound absorption performance.

* * * * *